W. E. MOORE.
CAR BRAKE.
No. 23,259.
PATENTED MAR. 15, 1859.
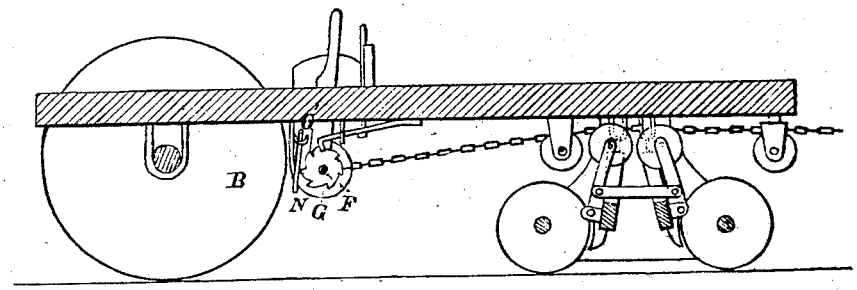
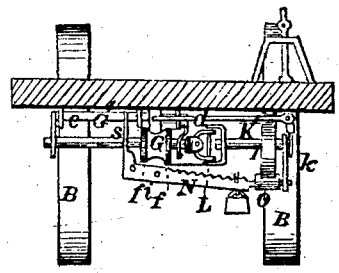
*ONLY DRAWING ACCESSIBLE*
*TAKEN FROM PATENT OFFICE REPORT*
*1859 — VOL. II.*

UNITED STATES PATENT OFFICE.

WILLIS E. MOORE, OF CRAWFORDSVILLE, INDIANA.

CAR-BRAKE.

Specification of Letters Patent No. 23,259, dated March 15, 1859.

*To all whom it may concern:*

Be it known that I, WILLIS E. MOORE, of Crawfordsville, in the county of Montgomery and State of Indiana, have invented certain new and useful Improvements in Railroad-Car Brakes; and I do hereby declare that the following is a full, clear, and exact description of the same, reference being had to the accompanying drawings, forming a part of this specification, in which—

Figure 1, is a vertical longitudinal section of a car brake with my improvements applied to it. Fig. 2, is an end view. Fig. 3, is an inverted plan, and Fig. 4, is a vertical transverse section of the same.

Similar letters of reference, in each of the several figures indicate corresponding parts.

My invention relates to an improvement in that character of R. R. brake which employs a friction roller for receiving the power from the locomotive wheels and transmitting it to the windlass chain shaft which applies the brake blocks to the car wheels.

The nature of my invention consists 1st in making the windlass chain shaft in two parts, and uniting said parts by a universal joint, and arranging the main friction roller on one section of the shaft and the windlass drum on the other; whereby the friction roller can be moved so as to have its periphery brought in contact with the periphery of the locomotive driving wheel, without moving that portion of the windlass shaft having the drum attached to it, and without destroying the connection of the friction roller and drum or interfering with their revolution together.

My invention consists 2nd, in the employment of an auxiliary friction roller in combination with the main roller and locomotive driving wheel, when said auxiliary roller is arranged to rise between the main friction roller and the locomotive wheel through a peculiar scale beam or weighing arrangement, and thus remove the power of the locomotive wheel from the main friction roller, whenever the resistance of the car wheels to the blocks and windlass chain exceeds the degree at which the weight of the scale beam is adjusted, as hereinafter specified.

My invention consists 3rd in the employment of a pivoted pawl in combination with a ratchet drum having two circles of reverse set teeth which incline on their deepest faces toward the center of the drum, whereby the same windlass can be made to apply the brake blocks through the same main friction roller, either in the back or forward movement of the train, and when the brake blocks are to be thrown off from the periphery of the car wheels and the shifting lever of the double acting pawl is set free, the pawl is automatically moved toward the center of the ratchet drum, out of connection with either set of the ratchet teeth.

To enable others skilled in the art, to make and use my invention, I will proceed to describe its construction and operation.

A, represents a car truck and B, B, the driving wheels of a locomotive.

C, C, are two brake blocks suspended between the car wheels by means of links $a$, $a$. These blocks are attached to two vertical levers D, D, which have their fulcra placed near their lower ends in cross bars $b$. In the upper forked ends of these levers, grooved pulleys $c$, $c$, are arranged. Around the pulleys $c$, $c$, and guide pulleys $d$, $d$, the windlass chain E, passes after starting out from the windlass as shown in the drawings.

F, is the turning windlass shaft. It is arranged just in rear of the driving wheels of the engine, in inclined bearings of a tilting or rocking frame G, which is hung on pivots at $d$, $d$, as shown, said pivots having their bearing in brackets $e$, $e$, suspended from the underside of the car truck as shown. To this windlass shaft, the chain E, is attached so as to wind upon it when it is desired to apply the brakes whether the train be moving forward or is being backed.

$G^2$, is a ratchet drum arranged fast on the windlass shaft. This drum has two circles of reverse set ratchet teeth $f$, $f'$, the deepest sides of which incline to the center plain surface of the drum, as shown.

H, is a pivoted pawl or stop for acting against the ratchet teeth. This pawl is connected with a hand lever I, which fits in notches of a stop plate $g$, arranged above the platform. By shifting the pawl in line with the teeth $f$, which position it occupies when the train is moving forward, it resists the revolution of the windlass in the direction of the arrow 1, and thus prevents the chain unwinding so as to release the brake blocks from the wheels; and when moved in line with the teeth $f$, which position it occupies when the train is backing, it resists the revolution of the windlass in the direction of the arrow 2. It will be observed that the ratchet teeth incline toward the center of the plain surface of the drum and consequently when the hand lever I, is released from the stop plate $g$, and the drum revolves, the pawl is forced laterally toward the said chain portion of the drum and the windlass allowed perfect freedom to turn in a manner to unwind the chain. The unwinding of the chain is effected by means of a spring (not shown) which is arranged between the levers of the brake-blocks.

J, is the main friction roller. It is attached to a shaft K, said shaft having one of its ends hung in a pivoted rocking bearing $h$, and its other end connected by a universal joint L, to one end of the windlass shaft, as shown. The rocking bearing $h$, terminates above the platform of the truck A, in a hand lever $h'$ whereby the rocking bearing, and consequently the friction roller, can be thrown in and out of contact with the periphery of the locomotive wheel from above the platform; when this friction roller is thrown in contact with the locomotive wheel the windlass shaft will not change its position as the universal connection allows the friction roller to be shifted without affecting the windlass; the connection however between the windlass and the friction roller shaft is maintained and consequently the power of the locomotive driving wheel is transmitted to the windlass shaft and from thence, by reason of the chain winding on said shaft, to the brake blocks which are brought forcibly in contact with the car wheels.

N, is a scale beam. It is hung on a pivot at $i$, and has its short end resting upon the rocking or tilting frame of the windlass and its long end fitted to work in a slot $j$, of a bearing $k$, which may form the lower termination of the hand lever $h'$. On this scale beam, a weight $k'$, is arranged to slide. An auxiliary friction roller O, is also arranged loosely on a round portion of the scale beam so as to stand below and opposite the meeting points of the locomotive wheel and the main friction roller.

By having the windlass arranged in a tilting frame and combining the scale beam and auxiliary friction roller with said frame as just described, it will be seen that, if the weight $k'$, is adjusted on the beam to balance a certain draft on the windlass chain which applies the brake blocks, when the draft on the chain exceeds the same the windlass frame will be tilted and its bearings brought to a perpendicular position instead of being allowed to stand inclined to a perpendicular, as represented, and consequently the short end $s$, of the scale beam is depressed by the part G', of the tilting frame, and its long end elevated, the slot in the lower end of the bearing $k'$, allowing it to thus rise; owing to the long end of the scale beam rising, the auxiliary friction roller is wedged in between the main friction roller and locomotive wheel, and caused to force the main friction roller out of contact with the locomotive wheel and thus relieve the windlass chain from further strain. Thus it will be seen the force upon the brake blocks and the draft upon the windlass chain is automatically controlled and all danger of the chain being broken or too great amount of force brought to bear upon the car wheels avoided.

Now to release the brake blocks when the auxiliary wheel has been applied as just stated, all that is necessary is to release the lever of the pawl H, from the notch of the stop plate $g$, when the inclination of the ratchet teeth of the drum will force said pawl to the plain center of the periphery of the drum and thus allow the spring between the brake block levers to unwind the chain and force the blocks from the periphery of the car wheels.

What I claim as my invention and desire to secure by Letters Patent, is—

1. Making the windlass chain shaft in two parts F, K, and uniting said parts by a universal joint L, and arranging the main friction roller J, on one section of the shaft F K and the windlass drum on the other, substantially as and for the purposes set forth.

2. The employment of an auxiliary friction roller O, in combination with the main roller J, and locomotive driving wheel B, when said auxiliary roller O, is arranged to rise between the main friction roller J, and the locomotive wheel B, through the peculiar scale beam or weighing arrangement G, G', N, $i$, $s$, $k'$, $d$, $e$, F, substantially as and for the purposes set forth.

3. The employment of a pivoted pawl H, in combination with a ratchet drum $G^2$, having two circles of reverse set teeth $f$, $f'$, which incline on their deepest faces toward the center of the drum, substantially as and for the purposes set forth.

WILLIS E. MOORE.

Witnesses:
   Edw. F. Brown,
   G. Yorke At Lee.